United States Patent
Richardson

(10) Patent No.: US 7,547,329 B1
(45) Date of Patent: Jun. 16, 2009

(54) BATTERY STATUS INDICATOR

(76) Inventor: Michael T. Richardson, 3011 Deerfoot Trail, Huron, OH (US) 44839

( * ) Notice: Subject to any disclaimer, the term of this patent is extended or adjusted under 35 U.S.C. 154(b) by 1014 days.

(21) Appl. No.: 10/901,665

(22) Filed: Jul. 29, 2004

Related U.S. Application Data

(60) Provisional application No. 60/491,659, filed on Jul. 29, 2003.

(51) Int. Cl.
  *H01M 4/82* (2006.01)
  *H01M 10/48* (2006.01)
(52) U.S. Cl. .................. 29/623.5; 429/93; 429/90; 429/91
(58) Field of Classification Search .......... 429/90, 429/91, 176
  See application file for complete search history.

(56) References Cited

U.S. PATENT DOCUMENTS

| | | | | |
|---|---|---|---|---|
| 4,275,999 | A | * | 6/1981 | Hetzel et al. ................. 417/299 |
| 6,483,275 | B1 | | 11/2002 | Nebrigic et al. ............. 320/135 |
| 2001/0046622 | A1 | * | 11/2001 | Barwick ....................... 429/90 |

* cited by examiner

*Primary Examiner*—Dah-Wei D Yuan
*Assistant Examiner*—Bryant Suitte
(74) *Attorney, Agent, or Firm*—Patrick J. Daugherty; Driggs, Hogg, Daugherty & Del Zoppo Co., LPA

(57) ABSTRACT

An apparatus and method for marking a battery as charged or uncharged, comprising a manually changeable label attached to a battery in a pocket region defined about a battery positive contact button, wherein the label may be changed by a user to indicate either charged or uncharged battery status.

4 Claims, 1 Drawing Sheet

BSD CONSTRUCTION

TYPICAL NIMH BATTERY NOTE RECESS AT TOP

OUR BOTTOM DISC

OUR BOTTOM DISC IN RECESS

OUR CARDBOARD INSULATOR

OUR INSULATOR IN PLACE WITH LABEL & INDICATOR

TYPICAL BATTERY CONSTRUCTION WITHOUT OUR INDICATOR

BATTERY STATUS INDICATOR

CROSS REFERENCE TO RELATED APPLICATIONS

This application claims the benefit of U.S. Provisional Application Ser. No. 60/491,659, filed Jul. 29, 2003.

BACKGROUND OF THE INVENTION

There is a need for a charge indicator that can be used on common nickel metal hydride cylindrical rechargeable batteries, also known as "NIMH cells." Typical sizes and styles are known as AAA, AA, C, D and 9-volt style package. These batteries are typically manufactured in Nickel Metal Hydride (Nimh) and Nickel Cadmium (Nicad). These rechargeable batteries can replace their counterparts being known as zinc and alkaline and can be recharged many times over, typically one thousand times, thus saving the user a considerable amount of expense for battery power over the life of these rechargeable types.

Utilizing these types of batteries presents the problem of keeping track of the charged batteries, and distinguishing them from discharged batteries. Prior art approaches include battery holder packs that can be marked charged and discharged, wherein a user needs to keep the batteries in these holders to identify their state. There are patents (such as U.S. Pat. No. 6,483,275) and designs that have the batteries themselves indicate their status of charge, a technique that requires circuits onboard and the like.

There is a growing use of battery power in the world for equipment like digital cameras that use a great deal of power and also need the portability of a small powerful universal battery. The market is growing very quickly. Battery manufacturers, as well as battery charger manufactures, have realized this and it would appear that this need for vast amounts of renewable power will continue for some time.

There is a need to identify a battery's state of charge so as not to place a discharged battery in with freshly charged batteries. This is also not wise due to discharging among themselves to level out the charge state of the group being used in the equipment. What is needed is a way to easily mark each individual battery before and after use in the equipment. It is really not necessary to know the exact state of the battery charge in most cases. The equipment in use typically has built in charge indicators, such as digital cameras to identify the level of the batteries. A typical user only cares to know that the batteries have been fully charged and that they are discharged after removing them from the equipment in use. This is why each battery needs to have an indicator. Typical charge indicators look at voltage levels, but NIMH batteries have a very distinctive discharge curve that keeps the battery at a given voltage level just before running out of power in an abrupt manner. Due to the sudden power drop-off characteristic of NIMH and Nicad batteries, prior art self-testing systems incorporated within or onto the battery cannot reliably indicate to a user whether the battery has a full usable charge.

SUMMARY OF THE INVENTION

An apparatus and method for marking a battery as charged or uncharged, comprising a manually changeable label attached to a battery in a pocket region defined about a battery positive contact button, wherein the label may be changed by a user to indicate either charged or uncharged battery status.

DESCRIPTION OF THE PREFERRED EMBODIMENTS

The present invention is a system and method to provide an indicator with each battery as they are being manufactured for only pennies cost to the manufactures, yet a wealth of convenience to end users by efficiently providing a way of knowing the state of each battery. This concept could potentially increase manufacturers' sales a great deal through the simplicity, low cost and novel method used for such an indicator.

Figure 1:
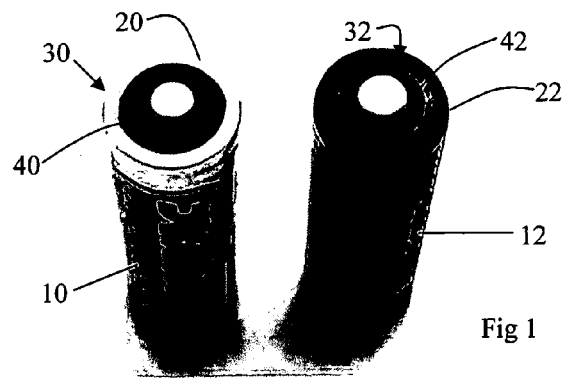
FIG. 1 is a perspective view of typical rechargeable batteries.

Referring now to FIG. 1, the rechargeable batteries 10 and 12 in discussion are manufactured in typically the same manor. The present invention takes advantage of spaces in the top portions 30 and 32 of each battery 10 and 12, respectively, where the can bodies 20 or 22 are crimped to top portion gaskets 40 and 42 of each cell 10 and 12. In this area, the two polarities of the battery are separated by the gaskets 40 and 42, which act as a seal and an insulator, as is well known in the art.

Figure 2:
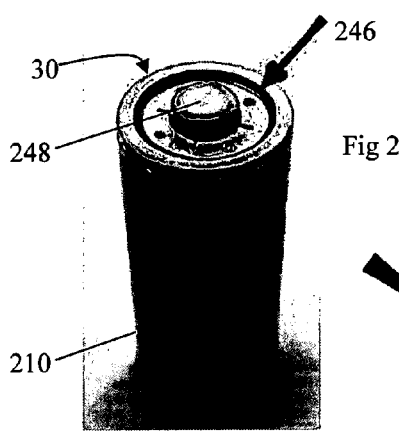
FIG. 2 is a perspective view of another typical rechargeable battery altered to accept the present invention.
Figure 3:
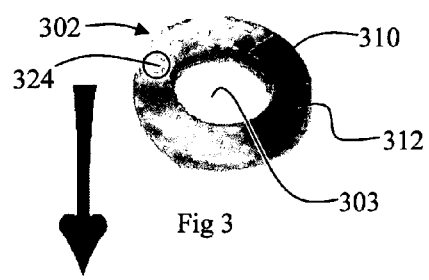
FIG. 3 is a perspective view of one element of the present invention.
Figure 4:
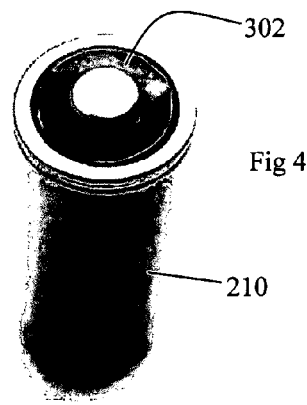
FIG. 4 is a perspective view of the rechargeable battery of FIG. 2 incorporating the element of FIG. 3.
Figure 5:
FIG. 5 is a perspective view of another element of the present invention.
Figure 6:
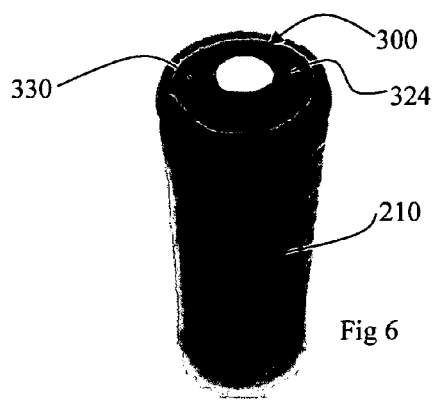
FIG. 6 is a perspective view of the rechargeable battery of FIG. 4 incorporating the element of FIG. 5.

Referring now to FIG. 2, according to the present invention, the gasket 40 is removed to create a pocket 246 around the contact positive button portion 248 of the top area 30 of the battery 10. This top area 30 is where venting is done by the battery 10, and most manufacturers typically place an insulating cardboard disc 40 on the top and shrink a portion of the outer battery label 20 around a portion of the disc 40 to prevent shorting of the battery poles by end users, as well as to improve appearance.

Inherently, there is a pocket space 246 left under the prior art disc 30, and referring now to FIGS. 3 through 6, the present invention utilizes this circular pocket space 246 to provide space for application of an improved insulating indicator 300. It is important to note that batteries are typically designed around standards for size, and manufacturers use the maximum amount of space available for the battery material to achieve the most powerful batteries they can for a package size. Taking space for things like indicators and reducing capacity would not be acceptable in the market. Thus, it is an advantage of the present invention that the application space utilized is a by-product of the manufacturing process and does not interfere with the function or performance aspects of the battery being manufactured.

The indicator 300 is preferably made up of two components: a top modified insulating disc 304 and a bottom indicator 302. The disc 304 has a disc central post aperture 305 and indicator 302 has an indicator central post aperture 303 formed to encircle the contact positive button portion 248. The insulating disc 304 may have similar material characteristics as used in current battery manufacturing. One embodiment is cardboard. What is new is that an indicator aperture 306 is formed in the disc 304. The bottom indicator 302 is a plastic or other non-conductive disc that is placed in the void area 246 under the insulating disc 304, preferably as the battery 10 is being finished. This indicator 302 has two distinct markings 310 and 312. It is preferred that the marking involve two contrasting colors, for example, a red ink area 310 and a green ink area 312.

The disc 304 also forms an engaging aperture 320, preferably on the other side, across the disc from the aperture 306. An engaging element 322 on the indicator 302 is aligned with the engaging aperture 320. Exemplary engaging element 322 embodiments include a hole aperture punched in the indicator 302 (not shown) and a raised knob 324 preferably formed from injection molding or press forming. The insulating disc 304 is now not just a plain flat round piece of cardboard, but a disc that has a unique indicator aperture 306 punched in it for viewing of the indicator disc 302 underneath.

With the indicator 302 residing in the cavity 246 under the uniquely punched insulating disc 304, a user is now able to see either a red or a green dot 330 through the indicator aperture 306. Across the insulating disc 304 is either a hole (not shown) or the raised knob 324 in the bottom indicator 302 that protrudes up through the engaging aperture 320. This knob 324 now becomes an activator, which can rotate along the engaging aperture 320, which is preferably an arch slot punched in the top cardboard insulating disc 304. The reason for the rotation is to allow the user the ability to rotate the bottom indicator 302 from side to side and cause either the red area 310 dot or the green area 312 to appear as a colored "dot" 330 in the aperture 306 window as punched in the top cardboard insulating disc 304.

It is preferable to use a raised embossed portion or injection molded part 324 rather than a flat disc with a hole for adjusting (not shown). A flat disc could be less expensive but would require a tool, like a pen, to rotate the disc. It would also not have the stops inherent of a raised section like button on the bottom disc and would also act as stops in the arch region, so as not to become lost in a continuous circular rotation under the top disc. Finally, the battery label is applied, and captures the two discs in the same way the label captures the one in typical battery production.

Although the present invention requires human intervention, and does not really tell the actual status of the battery 210, it is preferable over automated prior art indicators. A user of the battery 210 simply rotates the indicator 302 after charging the battery 210 and is now aware that they have performed the charge operation. The battery 210 can be transported in any fashion desired and in any holder or camera pack without regard to keeping these separate from discharged batteries. After using the batteries in the equipment, the user simply rotates the indicator 302 to the discharged position and will be aware of its condition so as not to mix this battery 210 with other charged batteries. The design and concept are just as robust and cost compliant as the design of the ordinary battery, and should last the life of the rechargeable battery itself.

As for the implementation of smart batteries that monitor themselves, this approach is not cost effective. Some human intervention, such as rotating the indicator 302 to change the status condition of the battery 210, is very simple and cost effective.

AFTERMARKET OPTION. Knowing that there may be some lack of interest for large battery manufacturers to change their processes and/or feel that the value of implementing the indicator may cost too much, the present invention may also be embodied as an optional "stick on" label style of indicator. The way it would work would be a circular ring type label (not shown) with a clear hole in the center for the positive button of the battery to protrude through. The label would be made in three pieces; one would be a bottom that had an adhesive on it to bond to the top of the battery cell. The second layer would be similar to the rotating indicator disc 302 with an embossed projection 324 on it to rotate the disc and the two red and green color areas 310 and 312 screen printed on it opposite the embossed projection 324. The third layer would be a top insulating disc 304 with the slot 320 for rotating the disc and window 306 for viewing indicator dot 330. The end user could apply this label to any number of batteries they desired and it can be manufactured to accommodate all cell sizes.

The present invention can also be made to accommodate rectangular 9-volt batteries by making the indicator 302 a rectangular laminated label rather than a circular label. This one would be placed on the bottom of 9-volt type batteries but could also become generic and be used for many other kinds of rechargeable batteries, such as cordless drill batteries and the like. The market for the aftermarket label could exceed the OEM style label in places like do it yourself home stores.

While preferred embodiments of the invention have been described herein, variations in the design may be made, and such variations may be apparent to those skilled in the art of battery manufacture and charge indicating systems, as well as to those skilled in other arts. The materials identified above are by no means the only materials suitable for the manufacture of the invention, and substitute materials will be readily apparent to one skilled in the art. The scope of the invention, therefore, is only to be limited by the following claims.

What I claim is:

1. An apparatus for marking a battery as charged or uncharged, comprising a manually changeable label attached to a battery in a pocket region defined about a battery positive contact button, wherein the label may be changed by a user to indicate either charged or uncharged battery status, and wherein the changeable label comprises a top modified insulating disc disposed above a bottom indicator, at least one of the top modified insulating disc and bottom indicator being non-conductive, the bottom indicator further comprises first and second visual markings and all engaging element, the indicator rotatably disposed about the positive contact button:

the top modified insulating disc further comprises an engaging aperture aligned above the engaging element and an indicator aperture aligned relative to the first and second visual markings, wherein the bottom indicator may be rotated about the contact button into a first position, aligning the first visual marking under the indicator aperture and a second position aligning the second visual marking under the indicator aperture.

2. The apparatus of claim 1, wherein the top modified insulating disc is held into position on the battery by an outer battery casing portion crimped upon the insulating disc, and wherein the changeable label is configured to replace a battery insulator element and occupy a volume dimension about equivalent to a volume dimension displacement within the pocket region defined by the insulator element.

3. A method for enabling the marking of a battery as charged or uncharged, comprising:

providing a manually changeable label configured for attachment to a battery in a pocket region defined about a battery positive contact button, the changeable label configured to be changed by a user to indicate either charged or uncharged battery status:

wherein the changeable label when attached to the battery in the pocket region comprises a top modified insulating disc disposed above a bottom indicator, at least one of the top modified insulating disc and bottom indicator being non-conductive;

wherein the bottom indicator further comprises first and second visual markings and an engaging element, the indicator rotatably disposed about the positive contact button; and wherein the top modified insulating disc further comprises an engaging aperture aligned above the engaging element and an indicator aperture aligned relative to the first and second visual markings, wherein the bottom indicator may be rotated about the contact button into a first position, aligning the first visual marking under the indicator aperture and a second position aligning the second visual marking under the indicator aperture.

4. The method of claim 3, wherein the top modified insulating disc is held into position on the battery by an outer battery casing portion crimped upon the insulating disc, and wherein the changeable label is configured to replace a battery insulator element and occupy a volume dimension about equivalent to a volume dimension displacement within the pocket region defined by the insulator element.

* * * * *